United States Patent
Bezryadin

(10) Patent No.: US 7,474,797 B2
(45) Date of Patent: Jan. 6, 2009

(54) SPACIAL-TEMPORAL PROCESSING OF DIGITAL IMAGES

(75) Inventor: Sergey N. Bezryadin, San Francisco, CA (US)

(73) Assignee: KWE International, Inc., South San Francisco, CA (US)

(*) Notice: Subject to any disclaimer, the term of this patent is extended or adjusted under 35 U.S.C. 154(b) by 428 days.

(21) Appl. No.: 11/293,315

(22) Filed: Dec. 1, 2005

(65) Prior Publication Data

US 2007/0127835 A1 Jun. 7, 2007

(51) Int. Cl.
*G06K 9/40* (2006.01)

(52) U.S. Cl. ...................................... 382/260
(58) Field of Classification Search ................ 382/260
See application file for complete search history.

(56) References Cited

U.S. PATENT DOCUMENTS

| | | | | |
|---|---|---|---|---|
| 6,067,125 A * | 5/2000 | May | ............................ | 348/607 |
| 6,734,414 B2 | 5/2004 | Street | | |
| 6,804,393 B2 | 10/2004 | Gindele et al. | | |
| 6,822,213 B2 | 11/2004 | Stark | | |
| 6,999,634 B2 * | 2/2006 | Hong | ......................... | 382/275 |
| 7,317,841 B2 * | 1/2008 | Yatsenko et al. | ............ | 382/260 |
| 2002/0028025 A1 * | 3/2002 | Hong | ......................... | 382/260 |
| 2002/0034337 A1 | 3/2002 | Shetker | | |

OTHER PUBLICATIONS

"Image Analysis Cookbook 6.0—Part 3" www.reindeergraphics.com/tutorial/Part_03.html, pp. 1-8.
"Tutorials: Image Noise—Part 2" www.cambridgeincolour.com/tutorials/noise2.htm, pp. 1-4.
"Noise Ninja: The Gold Standard for Noise Reduction" www.picturecode.com, pp. 1-2.
"Grain Surgery for Film and DV version 2" www.visinf.com/gs/ae/faq.jsp, pp. 1-3.

* cited by examiner

*Primary Examiner*—Samir A Ahmed
*Assistant Examiner*—Max Shikhman
(74) *Attorney, Agent, or Firm*—Michael Shenker; MacPherson Kwok Chen & Heid LLP

(57) ABSTRACT

A digital image processing system (134) receives a signal S(x,y,t,c) where (x,y) are pixel coordinates, t is time, and c is a color component. The system generates the signal S*(x,y,t,c) as a function of a linear combination of the values S(x',y',t',c) over a set A of points (x',y',t') with plural values (x',y') and plural values t', wherein each value S(x',y',t',c) in the linear combination is multiplied by a coefficient which is a function of the difference S(x,y,t,c)−S(x',y',t',c). In some embodiments, one or more of the values S(x',y',t',c) are replaced with previously calculated values S*(x',y',t',c) to save memory.

29 Claims, 2 Drawing Sheets

SPACIAL-TEMPORAL PROCESSING OF DIGITAL IMAGES

BACKGROUND OF THE INVENTION

The present invention relates to digital image processing.

FIG. 1A illustrates a digital image processing system. An image capture system 110 (e.g. part of a digital movie camera) captures an image of a scene 120 and generates digital data values G(x,y,t), where (x,y) are spacial coordinates of a picture element (pixel) and t is time. See FIG. 2. The image signal G(x,y,t) may contain noise caused by uneven numbers of photons captured by the system 110 ("photon noise"), imperfections of system 110, temperature variations, and possibly other sources. A digital image processing system 130 (e.g. part of a digital camera or a stand-alone computer), which includes a noise reduction module 134, performs some image improvements and outputs improved digital image data F(x,y,t). The data F(x,y,t) can be provided to an image display system 140 (e.g. a computer monitor or a television set) to display the image for viewing.

FIG. 1B illustrates the noise reduction module 134 in more detail. Module 134 receives a digital signal S(x,y,t) which is either equal to G(x,y,t) or obtained from the G signal via some processing. A spacial filter 210 performs some kind of spacial averaging for each fixed time t. Spacial filter examples are described in U.S. patent application Ser. No. 09/906,705 published as no. 2002/0028025 on Mar. 7, 2002, filed on Jul. 18, 2001 by Hong and incorporated herein by reference. The spacial filter's output signal $S_{xy}(x,y,t)$ is processed by a temporal filter 220 to take advantage of the image correlation at a given pixel at different times t. The temporal filter output is shown as S*(x,y,t). The signal S*(x,y,t) can be provided as signal F(x,y,t) on the output of system 130 (FIG. 1A), or can be processed further to obtain the signal F(x,y,t).

Noise reduction operations such as performed by module 134 involve a trade-off between effective noise reduction on the one hand and edge and detail blurring on the other hand. Another trade-off is that good image improvement may involve much processing and hence require high-cost circuitry and/or a long processing time. Some spacial filters 210 of FIG. 1A generate the value $S_{xy}(x,y,t)$ as a linear combination of the values S(x',y',t) with coefficients set to zero if the difference |S(x,y,t)−S(x',y',t)| exceeds a predefined threshold. Exceeding the threshold is taken as an indication of an edge or a detail in the image. The corresponding coefficients are zeroed out in order not to blur the edge or the detail.

It is desirable to provide new noise reduction systems which will be time and cost efficient and will provide effective noise reduction for at least some images.

SUMMARY

This section summarizes some features of the invention. Other features are described in the subsequent sections. The invention is defined by the appended claims which are incorporated into this section by reference.

In some embodiments, the signal S*(x,y,t) is generated as follows. Let the signal S(x,y,t,c) be either equal to the signal S(x,y,t) described above or be a color component of S(x,y,t) for a color c. The component can be the red, green or blue intensity for the RGB color representation, or a luminance or chrominance component, or a gray scale intensity for a monochromatic image (in which case S(x,y,t,c)=S(x,y,t), i.e. S(x,y,t,c) is the only component of signal S(x,y,t)), or some other component. The invention is not limited to any image representation. Correspondingly, let S*(x,y,t,c) be either equal to S*(x,y,t) or be a color component of S*(x,y,t). Then in some embodiments, the value S*(x,y,t,c) is generated as a function of a linear combination of the values S(x',y',t',c) over a set A of points (x',y',t') with plural values (x',y') and plural values t', wherein each value S(x',y',t',c) in the linear combination is multiplied by a coefficient which is a function of the difference S(x,y,t,c)−S(x',y',t',c). For example, in some embodiments, the value S*(x',y',t',c) is generated by dividing the linear combination described above by the sum of the coefficients. In some embodiments, the edge and detail blurring is reduced while effective noise reduction is provided. There are also less artifacts created in the image data S* when the image data include multiple color components. (An artifact is a color change in the processed image.)

In some embodiments, each coefficient is a non-constant decreasing function of |S(x,y,t,c)−S(x',y',t', c)|. As is well known, a function $f$ is called decreasing if for any numbers a>b in the domain of $f$, the condition holds that $f(a) \leq f(b)$. A function $f$ is called strictly decreasing if $f(a)<f(b)$. The coefficients for the S* computation can be strictly decreasing functions or can be step functions which are constant on some intervals but are non-constant over the summation range A.

In some embodiments, $$S^*(x,y,t,c) = \frac{\sum_{(x',y',t') \in A} [S(x',y',t',c) * K(x,y,t,c|S(x,y,t,c) - S(x',y',t',c)|, |x-x'|, |y-y'|, |t-t'|)]}{\sum_{(x',y',t') \in A} K(x,y,t,c|S(x,y,t,c) - S(x',y',t',c)|, |x-x'|, |y-y'|, |t-t'|)} \quad (1)$$

where the function K is either non-positive or non-negative (clearly, changing the sign of K does not change the output S*). Further, K satisfies the following condition. Let us replace:

S(x,y,t,c)−S(x',y',t',c) with $\arg_1$, x−x' with $\arg_2$, y−y' with $\arg_3$, and t−t' with $\arg_4$.

For each fixed (x,y,t), let us consider the absolute value function $|K(x,y,t,c,|\arg_1|,|\arg_2|,|\arg_3|,|\arg_4|)|$ as a function of independent arguments $\arg_1$, $\arg_2$, $\arg_3$, $\arg_4$. Then this absolute value function |K| is a non-constant decreasing function in each of $|\arg_1|$, $|\arg_2|$, $|\arg_3|$, $|\arg_4|$.

The term "coefficient" is used broadly to refer to either $$K(x,y,t,c, |S(x,y,t,c)-S(x',y',t',c)|, |x-x'|, |y-y'|, |t-t'|) \quad (2)$$

or to the normalized value $$\frac{K(x,y,t,c|S(x,y,t,c)-S(x',y',t',c)|, |x-x'|, |y-y'|, |t-t'|)}{\sum_{(x',y',t') \in A} K(x,y,t,c|S(x,y,t,c)-S(x',y',t',c)|, |x-x'|, |y-y'|, |t-t'|)} \quad (3)$$

In some embodiments, $$K(x,y,t,c, |S(x,y,t,c)-S(x',y',t',c)|,|x-x|,|y-y'|,|t-t'|) = \text{Const} \cdot \exp[-(\alpha \cdot (S(x',y',t',c)-s(x',y',t',c))^2 + \beta(|x-x'|^2+|y-y'|^2)+\gamma|t-t'|^2)] \quad (4)$$

where α, β, γ are positive values. For example, α can be inversely proportional to the square of an estimated deviation of the noise at pixel (x,y), and ,β and γ can be inversely proportional to the size of the summation range in space and time respectively. Const can be any non-zero constant.

In some embodiments, previously computed values S*(x', y',t',c) are used instead of S(x',y',t',c) to save memory.

The invention is not limited to the features and advantages described above. For example, in some embodiments, some color components are processed as described above while other color components of the same signal S undergo different processing. Other features and embodiments of the invention are described below. The invention is defined by the appended claims.

DESCRIPTION OF SOME EMBODIMENTS

The embodiments described in this section illustrate but do not limit the invention. The invention is defined by the appended claims.

In the equation (4), the exponential function exp can be replaced with some other function $f$:

$$K(x,y,t,c,|S(x,y,t,c)-S(x',y't',c)|,|x-x'|,|y-y'|,|t-t'|)=f(D) \quad (5)$$

where $$D=\alpha \cdot [S(x,y,t,c)-S(x',y',t',c)]^2+\beta[(x-x')^2+(y-y')^2]+\gamma(t-t')^2 \quad (6)$$

and $f(D) \geq 0$ for all D and $f(D)$ is a non-constant decreasing function of D, or $f(D) \leq 0$ for all D and $-f(D)$ is a non-constant decreasing function of D.

The summation region A can be a neighborhood of the point (x,y,t), e.g. the set of all points (x',y',t') within a predefined positive distance from (x,y,t). The region A may or may not depend on c. Of note, if $f(D)=\exp(-D)$ as in (4), then the coefficients K become negligible for large values of $\beta[(x-x')^2+(y-y')^2]+\gamma(t-t')^2$, and it is possible to enlarge the region A without a significant change to the output S*. In some embodiments, the region A is the set of all the points (x',y',t') in the image.

In some embodiments, the function $|f(D)|$ is strictly decreasing for all the D values. See equation (4) for example. Alternatively, the function $f(D)$ may be some approximation of the exponential function $\exp(-D)$ or some other non-negative strictly decreasing function or non-positive strictly-increasing function. For example, the function $f$ can be a step function defined as needed to facilitate its computation using integer computer arithmetic.

In some embodiments, $$\alpha=\alpha(x,y,t,c)=k_1/\sigma_n^2 \quad (7)$$

where $k_1$ is a constant and $\sigma_n=\sigma_n(x,y,t,c)$ is an estimated standard deviation of the noise at pixel (x,y) for the color c. The value $\sigma_n$ can be obtained in various ways, whether known or to be invented. See for example U.S. Pat. No. 6,804,393 issued Oct. 12, 2004 to Gindele et al., and U.S. patent application published as no. 2002/0034337 A1 on Mar. 21, 2002 filed by Shekter, both incorporated herein by reference.

The $\sigma_n^2$ estimate, or the $k_1$ coefficient in equation (7), may also vary based on some information about the noise sources. For example, for a digital movie camera, the α coefficient may depend on the shutter speed and other exposure parameters (which may be defined by the user, or may be automatically computed by the camera). Some embodiments use $k_1$ values in the range from 1/10 to 10, and any other value is possible.

Figure 1A:
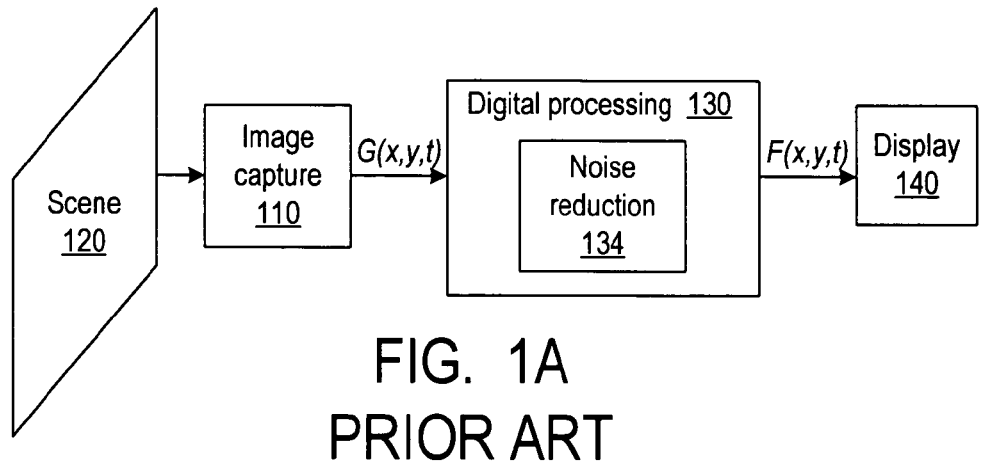
FIG. 1 is a block diagram of a prior art digital image processing system.
FIG. 1B is a block diagram of a noise reduction module of FIG. 1A.
Figure 1B:
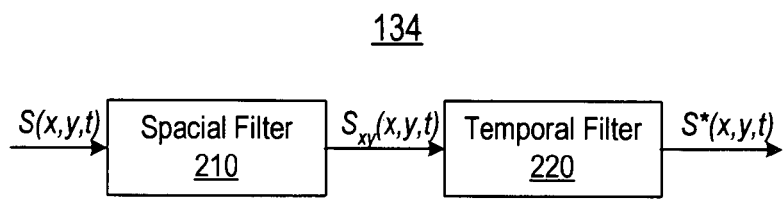
Figure 2:
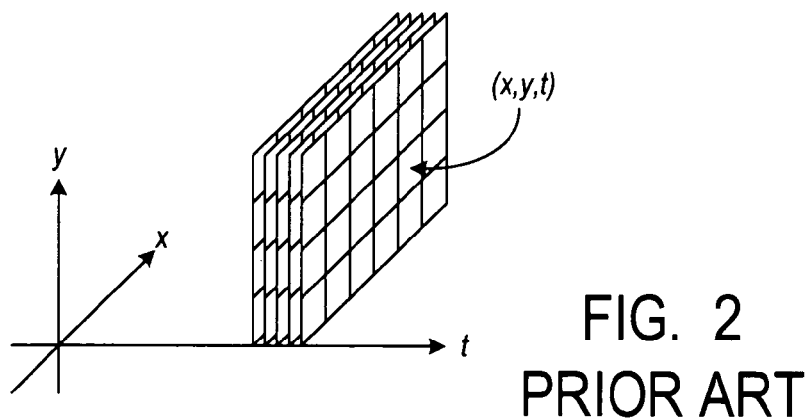
FIG. 2 illustrates digital image data in a spacial-temporal coordinate system.

In some embodiments, $$\beta=k_2/R^2 \quad (8)$$

where $k_2$ is a positive constant, and R is some parameter, for example, the radius of an image produced by the image capture system 110 (FIG. 1A) for a point in scene 120. Obviously, when R is larger, the corresponding K value is larger, and hence the S values at points (x',y',t') spacially distant from (x,y,t) are given greater weight in the S* computation (provided such points (x',y',t') are in the set A). In some embodiments, the R parameter is defined by the user. This parameter may be different for different points (x,y,t). For example, if the user wants to provide greater smoothing (blurring) of a part of the captured image, the user may define the R value to be greater for that part of the image, and smaller for the rest of the image. These examples are not limiting.

In some embodiments, $$\gamma=k_3/T^2 \quad (9)$$

where $k_3$ is a positive constant, and T is some parameter. If T is increased, than the S values at points (x',y',t') temporally distant from (x,y,t) are given greater weight in the S* computation (provided such points (x',y',t') are in the set A). In some embodiments, the parameter T is chosen by the user. The user may choose larger T for part of the image to obtain greater temporal blurring of that part of the image (e.g. to blur a moving object). These examples are not limiting.

In some embodiments, the noise reduction filter defined by equations (1), (5)-(6) is computationally inexpensive, and hence fast performance can be obtained with inexpensive circuitry. In some embodiments, the term $$\alpha[S(x,y,t,c)-S(x',y',t',c)]^2 \quad (10)$$

tends to reduce the edge and detail blurring in the noise-processed image data S*. The term $$\gamma(t-t')^2 \quad (11)$$

improves the noise filtering when the image data are temporally correlated.

Figure 3:
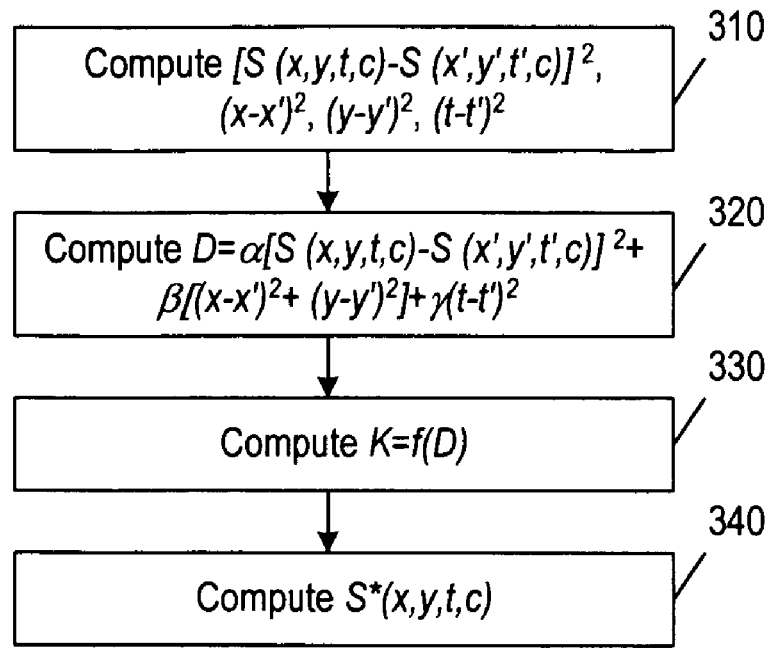
FIG. 3 is a flowchart of a noise reduction operation according to some embodiments of the present invention.

FIG. 3 shows exemplary computational operations performed to generate one value S*(x,y,t,c). At step 310, the values $[S(x,y,t,c)-S(x',y',t',c)]^2$, $(x-x')^2$, $(y-y')^2$, $(t-t')^2$ are computed for some point (x',y',t') in the set A. At step 320, the value D is computed according to equation (6). At step 330, the value $f(D)$ is computed. At step 340, these values are summed for all (x',y',t') in A to obtain the denominator on the right hand side of equation (1). The values $f(D)$ are multiplied by S(x',y',t',c) and summed to obtain the numerator. Then the division is performed to obtain S*(x,y,t,c). The S* value is written into a memory.

Figure 4:
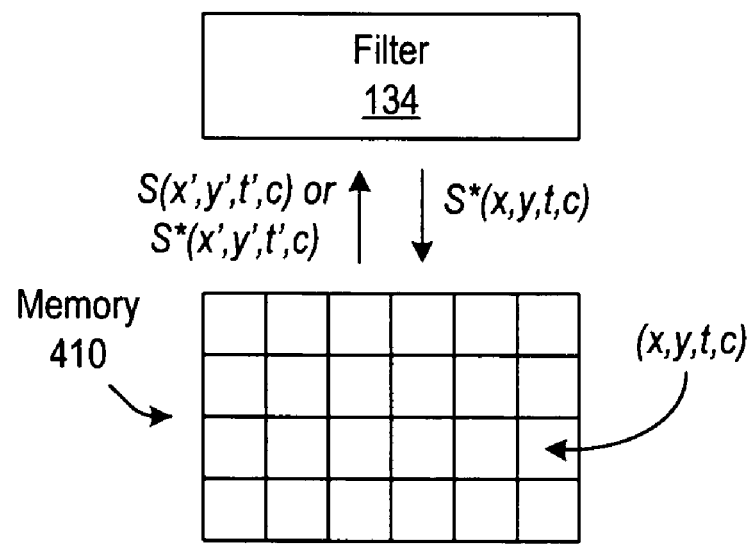
FIG. 4 is a block diagram illustrating data storage techniques in a noise reduction operation according to some embodiments of the present invention.

As shown in FIG. 4, the S* values can overwrite the S values to save memory. A single memory 410 stores only one of the values S(x,y,t,c), S*(x,y,t,c) in the location corresponding to the tuple (x,y,t,c). Initially the memory 410 is filled with the S values. At step 340, the value S*(x,y,t,c) is written into the location corresponding to the tuple (x,y,t,c), overwriting the S value at that location. When the step 310 requires the value S(x,y,t,c) to be used for computation of the S* value for some other tuple, then the value S*(x,y,t,c) is read out of memory 410 instead of S(x,y,t,c). This is acceptable in some embodiments if the S and S* values are close to each other.

The invention is not limited to the embodiments described above. For example, the argument D in equation (6) can be replaced with $$D = \alpha \cdot |S(x,y,t,c) - S(x',y',t',c)|^{u+\beta_1|x-x'|^{v1} + \beta_2|y-y'|^{v2} + \gamma|t-t'|^w} \quad (6A)$$

where u, v1, v2, w, $\beta_1$ and $\beta_2$ are positive values which may or may not depend on x, y, t, c. In some embodiments, $\beta_1$ and $\beta_2$ are positive coefficients given by equation (8), with the same or different $k_2$ values. More generally, in some embodiments, for each fixed point (x,y,t), D can be a polynomial in |S(x,y,t,c)−S(x',y',t',c)|, |−x'|, |y−y'|, |t−t'| such that:
  (1) D is strictly increasing in each of |S(x,y,t,c)−S(x',y',t',c)|, |x−x'|, |y−y'|, |t−t'|, and
  (2) D=0 when x=x', y=y', and t=t'.

For example, in some embodiments, $$D = \alpha \cdot (|S(x,y,t,c) - S(x',y',t',c)|^2 + |S(x,y,t,c) - S(x',y',t',c)|) + + |x-x'| \cdot |y-y'| + |t-t'|^2$$

The data S(x',y',t',c) can be replaced with S* (x',y',t',c) as explained above in connection with FIG. 4.

The invention can be implemented by software instructions stored on computer readable media and executed by a computer processor. The invention can also be implemented by hardwired circuitry. The software can be stored on data carriers such as magnetic or optical disks, semiconductor memory, and other memory devices. Another possible data carrier is a signal transmitted over a network link and carrying such software. Other embodiments and variations are within the scope of the invention, as defined by the appended claims.

The invention claimed is:

1. A computer-implemented method for processing digital image data, the method comprising:
    obtaining digital data S(x,y,t,c) representing an image at a plurality of pixels (x,y) and a plurality of time values t for at least one color component C;
    processing the data S(x,y,t,c) to determine, for at least one pixel (x,y) and at least one time value t, an image value S*(x,y,t,c) as a function of a linear combination of the values S(x',y',t',c) over a set A of points (x',y',t') with plural values (x',y') and plural values t', wherein each value S(x',y',t',c) in the linear combination is multiplied by a coefficient which is a function of the difference S(x,y,t,c)−S'(x',y',t', c), wherein for each (x',y',t',c), the value S'(x',y',t',c) is equal to either S(x,y,t,c) or S*(x',y', t',c);
    wherein for at least one said value S(x',y',t',c), the coefficient depends on S'(x',y',t',c) as a polynomial, or a ratio of polynomials, in exponential functions of polynomials in S(x,y,t,c)−S'(x',y',t',c) or in | S(x,y,t,c)−S'(x',y ',t',c)|.

2. The method of claim 1 wherein the processing operation comprises:
    calculating the expressions (S(x,y,t,c)−S'(x',y',t',c))$^u$, and/or (S'(x',y',t',c)−S(x,y,t,c))$^u$, and/or | S(x,y,t,c)−S'(x',y', t',c) |$^u$, where u is a positive value; and using said expressions to determine the value S*(x,y,t,c).

3. The method of claim 1 wherein all said coefficients are non-positive or all said coefficients are non-negative, and for each fixed (x,y,t), the absolute values of said coefficients are a non-constant decreasing function of | S(x,y,t,c)−S'(x',y',t', c)|.

4. A computer-implemented method for processing digital image data, the method comprising:
    obtaining digital data S(x,y,t,c) representing an image at a plurality of pixels (x,y) and a plurality of time values t for at least one color component c;
    processing the data S(x,y,t,c) to determine, for at least one pixel (x,y) and at least one time value t, an image value S*(x,y,t,c), wherein, for a set A of points (x',y',t') with plural values (x',y') and plural values t', $$S^*(x,y,t,c) = \frac{\sum_{(x',y',t') \in A} [S'(x',y',t',c) * K(x,y,t,c, |S(x,y,t,c) - S'(x',y',t',c)|, |x-x'|, |y-y'|, |t-t'|)]}{\sum_{(x',y',t') \in A} K(x,y,t,c, |S(x,y,t,c) - S'(x',y',t',c)|, |x-x'|, |y-y'|, |t-t'|)}$$

wherein:
    for each (x',y',t',c), the value S'(x',y',t',c) is equal to either S(x,y,t,c) or S*(x',y',t',c);
    the values K(x,y,t,c,|S(x,y,t,c)−S'(x',y',t',c)|,|x−x'|, |y−y'|, |t−t'|) are all non-positive or all non-negative; and
    for each fixed (x,y,t), the function |K(x,y,t,c,|arg$_1$|, |arg$_2$|, |arg$_3$|,|arg$_4$|)|, when considered as a function of independent arguments arg$_1$, arg$_2$, arg$_3$, arg$_4$, is a non-constant decreasing function in each of |arg$_1$|, |arg$_2$|, |arg$_3$|, arg$_4$|.

5. The method of claim 4 wherein $$K(x,y,t,c,|S(x,y,t,c)-S'(x',y',t',c)|,|x-x'|,|y-y'|,|t-t'|) = Const \cdot exp[-\alpha \cdot |S(x,y,t,c) - S'(x',y',t',c)|^u + \beta_1|x-x'|^{v1} + \beta_2|y-y'|^{v2} + \gamma|t-t'|^w]$$

wherein $\alpha$, $\beta_1$, $\beta_2$, $\gamma$, u, v1, v2, w are positive values, and Const is a non-zero constant.

6. The method of claim 5 wherein u=v1=v2=w=2.

7. The method of claim 5 wherein $\alpha=\alpha(x,y,t,c)=k_1/\sigma_n^2$ where $k_1$ is a constant and $\sigma_n=\sigma_n(x,y,t,c)$ is an estimated standard deviation of a noise at pixel (x,y).

8. The method of claim 1 wherein for each (x',y',t',c), the value S'(x',y',t',c) is equal to S(x,y,t,c).

9. A computer system comprising: a computer processor and a memory in communication with said processor, the memory storing computer executable instructions which cause the processor to perform the method of claim 1.

10. A computer readable medium encoded with computer executable instructions which are operable to cause a computer to perform the method of claim 1.

11. A computer system comprising: a computer processor and a memory in communication with said processor, the memory storing computer executable instructions which cause the processor to perform the method of claim 2.

12. A computer readable medium encoded with computer executable instructions which are operable to cause a computer to perform the method of claim 2.

13. A computer system comprising: a computer processor and a memory in communication with said processor, the memory storing computer executable instructions which cause the processor to perform the method of claim 3.

14. A computer readable medium encoded with computer executable instructions which are operable to cause a computer to perform the method of claim 3.

15. A computer system comprising: a computer processor and a memory in communication with said processor, the memory storing computer executable instructions which cause the processor to perform the method of claim 4.

16. A computer readable medium encoded with computer executable instructions which are operable to cause a computer to perform the method of claim 4.

17. A computer system comprising: a computer processor and a memory in communication with said processor, the memory storing computer executable instructions which cause the processor to perform the method of claim 5.

18. A computer readable medium encoded with computer executable instructions which are operable to cause a computer to perform the method of claim 5.

19. A computer system comprising: a computer processor and a memory in communication with said processor, the memory storing computer executable instructions which cause the processor to perform the method of claim 6.

20. A computer readable medium encoded with computer executable instructions which are operable to cause a computer to perform the method of claim 6.

21. The method of claim 1 wherein at least one of said points (x',y',t') of the set A is such that (x',y') is different from (x,y) and t' is different from t.

22. The method of claim 21 wherein the set A is a neighborhood of the point (x,y,t).

23. The method of claim 4 wherein for each (x',y',t',c), the value S'(x',y',t',c) is equal to S(x,y,t,c).

24. The method of claim 4 wherein at least one of said points (x',y',t') of the set A is such that (x',y') is different from (x,y) and t' is different from t.

25. The method of claim 24 wherein the set A is a neighborhood of the point (x,y,t).

26. The method of claim 5 wherein at least one of said points (x',y',t') of the set A is such that (x',y') is different from (x,y) and t' is different from t.

27. The method of claim 26 wherein the set A is a neighborhood of the point (x,y,t).

28. The method of claim 6 wherein at least one of said points (x',y',t') of the set A is such that (x',y') is different from (x,y) and t' is different from t.

29. The method of claim 28 wherein the set A is a neighborhood of the point (x,y,t).

* * * * *